(12) United States Patent
Park

(10) Patent No.: US 8,423,040 B2
(45) Date of Patent: Apr. 16, 2013

(54) APPARATUS AND METHOD FOR MANAGING RADIO RESOURCES BASED ON TRAFFIC PATTERN OF USER EQUIPMENT

(75) Inventor: Choong-Wan Park, Gyeonggi-Do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/372,659

(22) Filed: Feb. 14, 2012

(65) Prior Publication Data

US 2012/0208548 A1     Aug. 16, 2012

(30) Foreign Application Priority Data

Feb. 14, 2011    (KR) ........................ 10-2011-0012887

(51) Int. Cl.
*H04W 24/00* (2009.01)
*H04W 72/04* (2009.01)

(52) U.S. Cl.
USPC ......... 455/452.2; 370/330; 370/329; 455/450

(58) Field of Classification Search ................. 455/450, 455/437, 63.1, 452.1, 452.2, 422.1, 512; 370/252, 331, 328, 332, 330, 329, 229
See application file for complete search history.

(56) References Cited

U.S. PATENT DOCUMENTS

2007/0291692 A1* 12/2007 Choi et al. ................... 370/330
2010/0039999 A1* 2/2010 Barbaresi et al. ............. 370/329

* cited by examiner

*Primary Examiner* — Kiet Doan
(74) *Attorney, Agent, or Firm* — IP Legal Services, LLC

(57) ABSTRACT

Provided are an apparatus and method for managing radio resources according to a traffic pattern of user equipment. The apparatus may include a memory, a QoS level setup unit, a transition condition setup unit, and a radio resource manager. The memory may be configured to collect and store quality of service (QoS) information of the user equipment. The QoS level setup unit may be configured to determine a QoS level of the user equipment based on the QoS information in the memory. The transition condition setup unit may be configured to set transition conditions associated with the user equipment based on the determined QoS level of the user equipment. The radio resource manager may be configured to manage radio resources associated with the user equipment by initiating transition between a first radio resource control (RRC) state and a second RRC state according to the setup transition conditions of the user equipment.

17 Claims, 5 Drawing Sheets

APPARATUS AND METHOD FOR MANAGING RADIO RESOURCES BASED ON TRAFFIC PATTERN OF USER EQUIPMENT

CROSS REFERENCE TO PRIOR APPLICATIONS

The present application claims priority under 35 U.S.C. §119 to Korean Patent Application No. 10-2011-0012887 (filed on Feb. 14, 2011), which is hereby incorporated by reference in its entirety.

FIELD OF THE INVENTION

The present invention relates to wireless communications and, in particular, to managing radio resources in a wireless communications system.

BACKGROUND OF THE INVENTION

Lately, wireless communication technology has exhibited dramatic and rapid development. Such dramatic development of wireless communication technology has advanced user equipment functionality. Advanced user equipment, such as a smart phone, enables a user to perform many complicated daily tasks conveniently and efficiently. For example, through the advanced user equipment, a user can communicate with other parties, exchange messages with other parties, do web-surfing, navigate a route, listen to music, and/or watch video and movies through a streaming service. The advanced user equipment, however, disadvantageously increases an amount of data traffic and consumes a large amount of radio resources in a communication network. Since radios resources are limited in a communication network, there has been a demand for developing methods for effectively utilizing limited radio resources in a communication network.

In order to effectively utilize limited radio resources, a radio resource control (RRC) protocol has been introduced. In the RRC protocol, radio resources such as channels between the user equipment and a RNC are managed based on an amount of data traffic and a required power consumption level. For example, when the user equipment has data to transmit and receive, a RRC connection is established between the user equipment and the RNC in a connected mode and the RRC connection may be managed based on RRC states of the connected mode. For example, at least one of a dedicated channel, a shared channel, and a paging channel may be allocated to the user equipment according to RRC states. Such RRC states may be transitioned based on a given state transition condition. The given state transition condition may include a timer and a traffic amount threshold. For example, an amount of generated data traffic may be monitored until the timer expires and the RRC state transition may be initiated based on the comparison result. For example, when the generated data traffic amount is greater than the traffic amount threshold, an idle mode may transition to a Cell_dedicated channel (Cell_DCH) state and a dedicated channel may be allocated to user equipment. When the data traffic is not generated for the given timer in a Cell_DCH state, the Cell_DCH state may transition to a Cell_forward access channel (Cell_FACH) state and a shared channel or a paging channel may be allocated to the user equipment. When no data is present to be transmitted or received during the period until the given timer expires in the Cell_FACH state, the connected mode transitions to an idle mode and the allocated channel is released from use by the user equipment.

As described above, the same state transition conditions are applied to initiate RRC state transition although differing user equipment can generates traffic patterns significantly different from one another. For example, the same timer period and the same traffic amount threshold have been used to initiate the state transition in the RRC protocol. However, user equipment generates traffic patterns that can be significantly different according to user equipment type and/or a data subscription plan. For example, a smart phone may generate more data calls than a standard phone. The standard phone may generate more voice calls than the smart phone. Furthermore, user equipment with an unlimited data subscription plan may generate more data calls than user equipment with a limited data subscription plan. If the same timer period and the same traffic amount threshold are identically applied for the state transition regardless of traffic pattern, unnecessary state transitions might be made more frequently.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, radio resources may be managed based on a traffic pattern of a subscriber such as user equipment.

In accordance with another aspect of the present invention, a radio network controller may perform state transition based on a pattern of using a data call, for example, a traffic pattern of user equipment.

In accordance with an exemplary embodiment of the present invention, a method is provided for managing radio resources according to a traffic pattern of user equipment in a communication network. The method may include determining a quality of service (QoS) level of the user equipment based on QoS information associated with the user equipment, setting transition conditions based on the determined QoS level of the user equipment, and managing radio resources associated with the user equipment according to the set transition conditions.

The QoS level of the user equipment may indicate a pattern of generating data traffic in the user equipment, and the user equipment having the QoS level higher than a given level may provide data traffic relatively more frequently than user equipment having a QoS level lower than the given level.

The QoS information may include information on at least one of a QoS priority assigned to the user equipment, a type of the user equipment, and a data subscription. The QoS level of the user equipment may be higher than a given level when the QoS information indicates at least one of that a high QoS priority is assigned to the user equipment, that the type of the user equipment is a smart phone, and that the user equipment is registered with an unlimited data subscription plane.

The QoS information may be included in a radio access bearer (RAB) assignment request message transmitted from a core network.

The QoS information may include a traffic handling priority and an allocation/retention priority.

The QoS level may be based on at least one of a value of the traffic handling priority, a value of the allocation/retention priority, and a combination of the value of the traffic handing priority and the value of the allocation/retention priority.

In the setting transition conditions, the transition conditions may include a timer having a period and a traffic amount threshold for initiating transition between a first radio resource control (RRC) state and a second RRC state, and the timer having the period and the traffic amount threshold may be set according to the determined QoS level of the user equipment.

The QoS level greater than the given QoS level may indicate that the user equipment provides data traffic of a level more than user equipment having a QoS level smaller than the given QoS level, and the QoS level smaller than the given QoS level may indicate that the user equipment provides data traffic of a level less than user equipment having a QoS level greater than the given QoS level.

When the QoS level of the user equipment is greater than a given QoS level, the timer and the traffic amount threshold may be set to initiate state transition less frequently than user equipment having a QoS level smaller than the given QoS level. When the QoS level of the user equipment is smaller than the given QoS level, the timer and the traffic amount threshold may be set to initiate state transition more frequently than user equipment having a QoS level greater than the given QoS level.

The timer may be set with a timer period value greater than a given time value and the traffic amount threshold is set with a traffic value smaller than a given threshold when the QoS level of the user equipment is greater than a given QoS level. Furthermore, the timer may be set with a timer period value smaller than the given time value and the traffic amount threshold may be set with the traffic value smaller than the given threshold when the QoS level of the user equipment is smaller than the given QoS level.

The timer and the traffic amount threshold may include a first timer and a first traffic amount threshold for transition between a Cell_dedicated channel (Cell_DCH) state and a Cell_forward access channel (Cell_FACH) state, a second timer and a second traffic amount threshold for transition between a Cell_FACH state and a UTRAN registration area_paging channel (URA_PCH) state or a Cell_paging channel (Cell_PCH) state, a third timer and a third traffic amount threshold for transition between a URA_PCH state or a Cell_PCH state and an idle mode.

The managing radio resources may include controlling transition between a first radio resource control (RRC) state and a second RRC state according to the set transition conditions.

The managing radio resources may include monitoring an amount of data traffic generated until the timer expires, comparing the generated data traffic amount with the traffic amount threshold, and initiating transition between a first radio resource control (RRC) state and a second RRC state according to the comparison result.

The radio resources may be channels associated with the user equipment according to transition of a radio resource control (RRC) state. In this case, the method may include establishing the channels between the user equipment and a core network through a radio access network.

In accordance with another embodiment of the present invention, a method is provided for controlling transition of a radio resource control (RRC) state according to a quality of service (QoS) level of user equipment. The method may include receiving a radio access bearer (RAB) assignment request message from a core network, collecting a traffic handling priority and an allocation/retention priority from the RAB assignment request message, determining the QoS level of the user equipment based on the collected traffic handling priority and allocation/retention priority, setting a timer and a traffic amount threshold according to the determined QoS level of the user equipment, monitoring an amount of data traffic generated until the set timer expires, comparing the generated data traffic amount with the set traffic amount threshold, and initiating transition between a first RRC state and a second RRC state based on the comparison result.

In accordance with another embodiment of the present invention, an apparatus is provided for managing radio resources according to a traffic pattern of user equipment. The apparatus may include a memory, a QoS level setup unit, a transition condition setup unit, and a radio resource manager. The memory may be configured to collect and store quality of service (QoS) information of the user equipment. The QoS level setup unit may be configured to determine a QoS level of the user equipment based on the QoS information in the memory. The transition condition setup unit may be configured to set transition conditions associated with the user equipment based on the determined QoS level of the user equipment. The radio resource manager may be configured to manage radio resources associated with the user equipment by initiating transition between a first radio resource control (RRC) state and a second RRC state according to the setup transition conditions of the user equipment.

The memory may be configured to store, as the QoS information, a traffic handling priority and an allocation/retention priority included in a radio access bearer (RAB) assignment request message transmitted from a core network. In this case, the QoS level setup unit may be configured to determine the QoS level based on at least one of a value of the traffic handling priority, a value of the allocation/retention priority, and the combination of the value of the traffic handling priority and the value of the allocation/retention priority.

The transition condition may include a timer having a period and a traffic amount threshold adapted to initiate transition between a first radio resource control (RRC) state and a second RRC state. In this case, the radio resource manager may be configured to monitor an amount of data traffic generated until the timer expires, compare the generated data traffic amount with the traffic amount threshold, and initiate the transition between the first RRC state and the second RRC state according to the comparison result.

The QoS level greater than the given QoS level may indicate that the user equipment is expected to generate data traffic more than user equipment having a QoS level smaller than the given QoS level. In this case, the transition condition setup unit may be configured to set the timer and the traffic amount threshold so as to initiate the transition less frequently for user equipment having the QoS level greater than a given QoS level, and set the timer and the traffic amount threshold so as to initiate the transition more frequently for user equipment having the QoS level smaller than the given QoS level.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
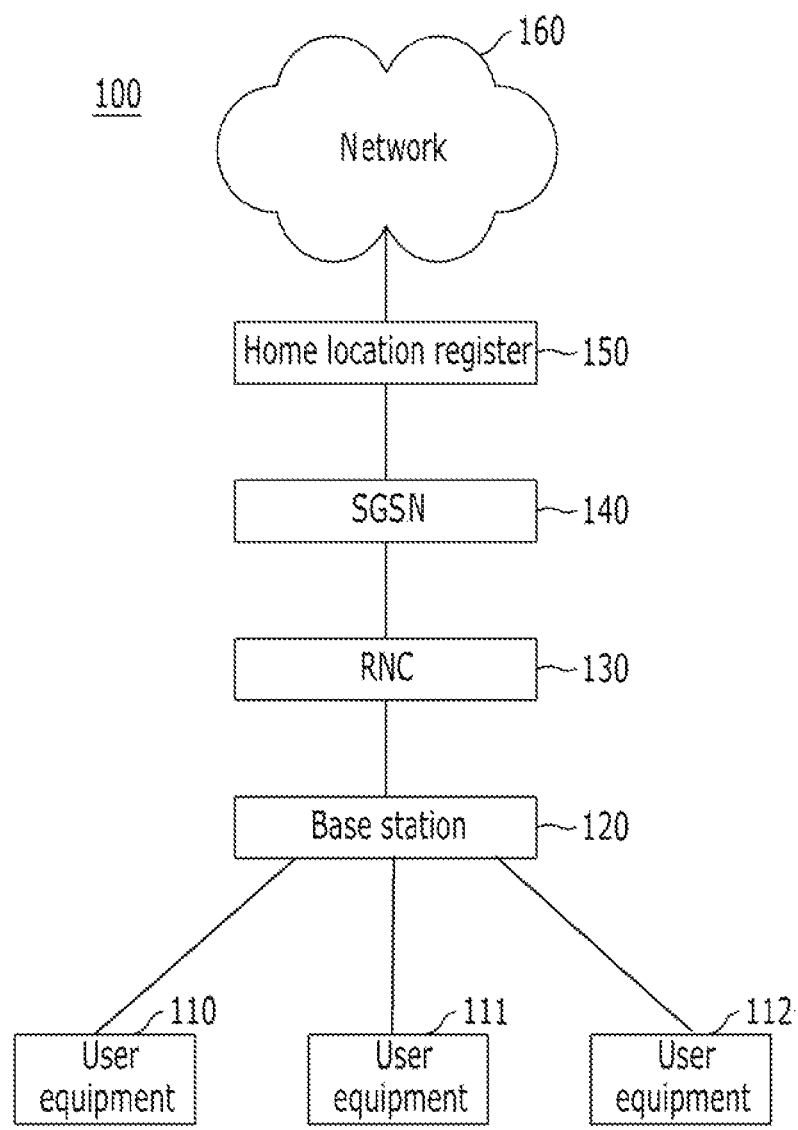
FIG. 1 illustrates a radio communication network employing one or more embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

For convenience and ease of understanding, an apparatus and method for managing radio resources according to a traffic pattern of user equipment in accordance with an exemplary embodiment of the present invention will be described as managing radio resources in a 3rd generation partnership project universal mobile telecommunication system (3GPP UMTS) network. The present invention, however, is not limited thereto. For example, the present invention may be applied to a global system for mobile communication (GSM) or a long term evolution (LTE) advanced network.

FIG. 1 illustrates a radio communication network employing one or more embodiments of the present invention.

Referring to FIG. 1, radio communication network 100 may include user equipment 110-112, base station 120, radio network controller (RNC) 130, serving general packet radio service (GPRS) support node (i.e., "SGSN") 140, home location register 150, and network 160. The following describes operation with user equipment 110, although operation of other user equipment 111 and 112 might be analogous to that of user equipment 110.

User equipment 110 may be connected to network 160 through a radio communication network including base station 120, RNC 130, SGSN 140, and home location register 150. User equipment 110 may receive data from, or transmit data to, entities on network 160 through the radio communication network. In order to receive or transmit data, user equipment 110 may establish radio connections to SGSN 140. For example, radio connections may include a radio resource control (RRC) connection and a radio access bearer (RAB) connection. The RRC connection may be formed between user equipment 110 and RNC 130 and the RAB may be formed between RNC 130 and SGSN 140.

Base station 120 may be directly connected to several user equipment 110 to 113 and deliver data between user equipment 110 and RNC 130. For example, base station 120 may receive a radio signal from user equipment 110, convert the radio signal to a baseband signal, and transmit the baseband signal to RNC 130. Furthermore, base station 120 may receive a baseband signal from RNC 130, convert the baseband signal to a radio signal, and transmit the radio signal to user equipment 110.

RNC 130 may be connected to base station 120 and manage radio resources. RNC 130 may be a service access point connected to a core network including SGSN 140 and home location register 150. For example, RNC 130 may perform radio resource allocation, radio resource modification, and radio resource release in the radio communication network. Particularly, RNC 130 may employ a radio resource control (RRC) protocol to manage radio resources. The RRC protocol defines a connected mode and an idle mode. In connected mode, radio resources may be managed according to RRC states such as a Cell_dedicated channel (Cell-DCH) state, a Cell_foward access channel (Cell_FACH) state, a Cell_paging channel (Cell_PCH), and a UTRAN registration area_paging channel (URA_PCH) state. Such RRC states and transition thereof will be described in detail with reference to FIG. 2.

SGSN 140 may be a support node of a core network. SGSC 140 may perform a role as a packet switching device in the core network. SGSC 140 may perform packet routing, packet transmission, and mobility management such as attach/detach process and local management, logical link management and authentication of user equipment 110. SGSN 140 may include a visitor location register (VLR) for storing location information of user equipment 110.

Home location register 150 may be a database containing information on each subscriber. For example, home location register 150 may include information on a mobile identification number (MIN) of user equipment 110, an electronic serial number (ESN) of user equipment 110, and service types. Home location register 150 may store a service profile of each subscriber. Such service profile may include information on base station 120 and RNC 130 to which user equipment 110 is coupled. Home location register 150 may be connected to service provider network 160. Network 160 may include a service provider mobile network, Internet, and a public switched telephone network. In FIG. 1, home location register 150 may be illustrated as an independent device on the radio communication network, but the present invention is not limited thereto. Home location register 150 may be integrally implemented, in some embodiments, with SGSN 140.

As described above, RNC 130 may manage radio resources occupied for establishing a radio connection between user equipment 110 and network 160 according to the RRC protocol. The RRC protocol may define two general modes: a connected mode and an idle mode. In connected mode, five RRC states may be defined. The RRC states may include a Cell-DCH state, a Cell_FACH state, a Cell_PCH, and a URA_PCH state. For example, at least one of a dedicated channel, a shared channel, or a paging channel may be allocated to user equipment 110 according to a RRC state. Such RRC states may transition between one another based on, for example, a traffic amount or a required power consumption level. Hereinafter, RRC states in a connected mode and state transitions thereof will be described with reference to FIG. 2.

Figure 2:
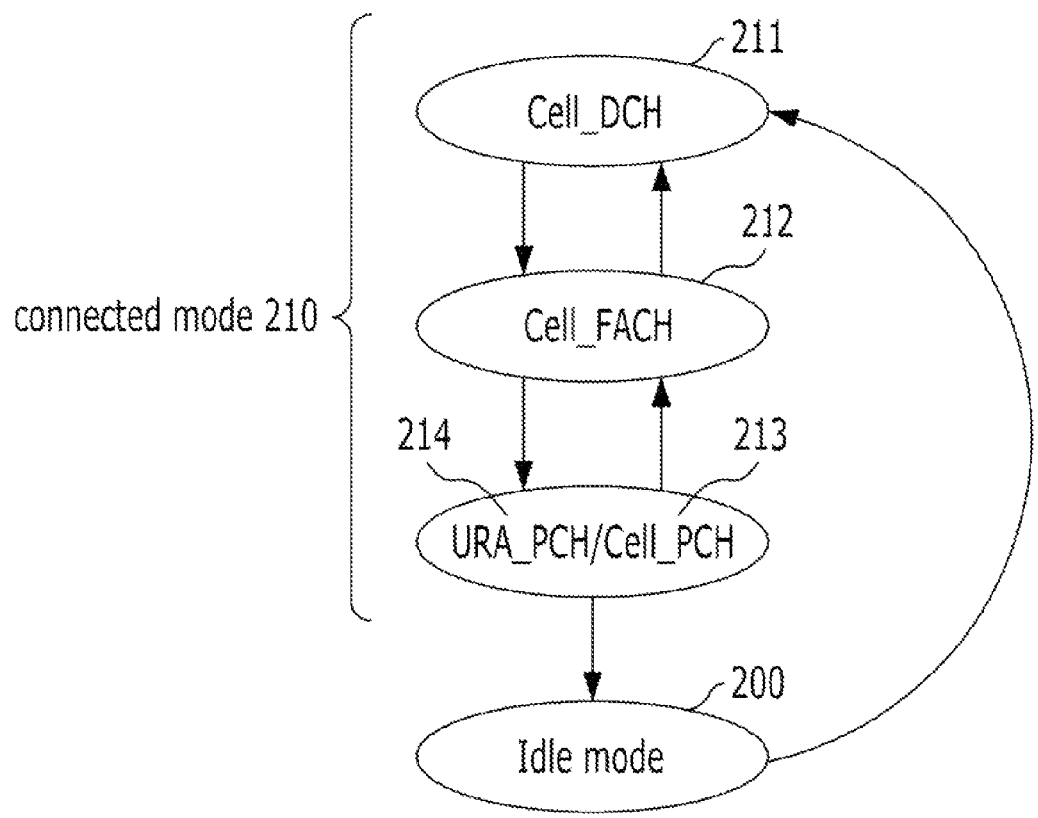
FIG. 2 illustrates RRC states and state transitions as might be employed by the network of FIG. 1.

FIG. 2 illustrates RRC states and state transitions.

Referring to FIG. 2, the RRC protocol may define two modes: connected mode 210 and idle mode 200. A RRC connection may not be established or an existing RRC connection may be released in idle mode 200. On the contrary, a RRC connection may be established in connected mode 210 and managed according to RRC states. The RRC states may include Cell-DCH state 211, Cell_FACH state 212, Cell_PCH 213, and URA_PCH state 214.

When data traffic is generated in idle mode 200, idle mode 200 transitions to Cell_DCH state 211 of connected mode 210. In Cell_DCH state 211, a dedicated physical channel may be allocated to user equipment 110 in an uplink and/or a downlink. Accordingly, user equipment 110 may transmit and receive data at a comparatively fast speed through the allocated dedicated physical channel in Cell_DCH state 211. User equipment 110, however, may consume a large amount of radio resources in Cell_DCH state 211 because the dedicated physical channels are always allocated to the user equipment.

Cell_DCH state 211 may transition to Cell_FACH state 212 when data traffic is not generated for a certain period, for example, until a first timer T1 expires, in Cell_DCH state 211 or when an amount of generated data traffic is smaller than a given threshold in Cell_DCH state 211. In Cell_FACH state 212, user equipment 110 may not be allocated with a dedicated physical channel in the uplink and/or the downlink. User equipment 110 may be allowed to only use a common or shared channel. Accordingly, user equipment 110 may be enabled to exchange a small amount of uplink/downlink data in Cell_FACH state 212. Since only a common or shared channel is used in Cell_FACH state 212, user equipment 110 may not consume a large amount of radio resource as compared to Cell_DCH state 211. A data transmitting/receiving speed of Cell_FACH state 212 may be slower than that of Cell_DCH state 211. When a large amount of data traffic is generated in Cell_FACH state 212, Cell_FACH state 212 may transition back to Cell_DCH state 211 because a comparatively fast data transmitting/receiving speed is required.

When data traffic is not generated for a certain period, for example, until a second timer T2 expires, in Cell_FACH state 212, Cell_FACH state 212 may transition to at least one of Cell_PCH 213 and URA_PCH 214. In Cell_PCH state 213 and URA_PCH state 214, uplink activities may not be allowed. User equipment 110 may be only allowed to operate with downlink data. For example, user equipment 110 may receive a paging message from a radio network controller through a paging channel. Accordingly, user equipment 110 monitors a paging channel at a discontinuous reception cycle (CRX) in Cell_PCH state 213 or URA_PCH state 214. Since no resources are granted for data transmission in Cell_PCH state 213 or URA_PCH state 214, a transition to another state may be required for data transmission. For example, data transmission may require transition from URA_PCH state 214 to Cell_FACH state 212.

When downlink data traffic to user equipment 110 is generated in Cell_PCH state 213 or URA_PCH 214, the user equipment may wake up by signal from a paging channel. Then, Cell_PCH state 213 or URA_PCH state 214 may transition to Cell_FACH state 212 or Cell_DCH 211. When data traffic is not generated for a given period such as, for example, until a third timer T3 expires, in Cell_PCH state 213 or URA_PCH state 214, a RRC connection release procedure may be initiated and the RRC connection may be released. Then, Cell_PCH state 213 or URA_PCH state 214 may transition to idle mode 200. User equipment 110 may monitor a paging indicator channel (PICH) in idle mode 200.

RNC 130 may monitor an amount of data traffic generated until i) the timers T1, T2, and T3 expire and ii) whether the generated data traffic amount exceeds a traffic amount threshold in each RRC state. Based on the monitoring result, RNC 130 may manage transition of RRC states. The timers T1, T2, and T3 and the traffic amount threshold, however, are set up regardless of a traffic pattern of user equipment in a typical management method. Since the traffic pattern may be significantly different according to a type of user equipment 110 or a data subscription plan, radio resources may not be effectively managed in this manner. Accordingly, there is a need for developing a method for managing radio resources according to a traffic pattern of user equipment.

In accordance with an exemplary embodiment of the present invention, radio resources may be managed according to a traffic pattern of user equipment. Particularly, a timer period and a traffic amount threshold may be differently determined according to a pattern of making data calls in user equipment. Radio resources may be managed by transitioning RRC states according to the timer and the traffic amount determined in consideration of a traffic pattern of user equipment. Hereinafter, an apparatus and a method for managing radio resources according to a traffic pattern of user equipment in accordance with an exemplary embodiment of the present invention will be described with reference to FIGS. 3, 4 and 5.

Figure 3:
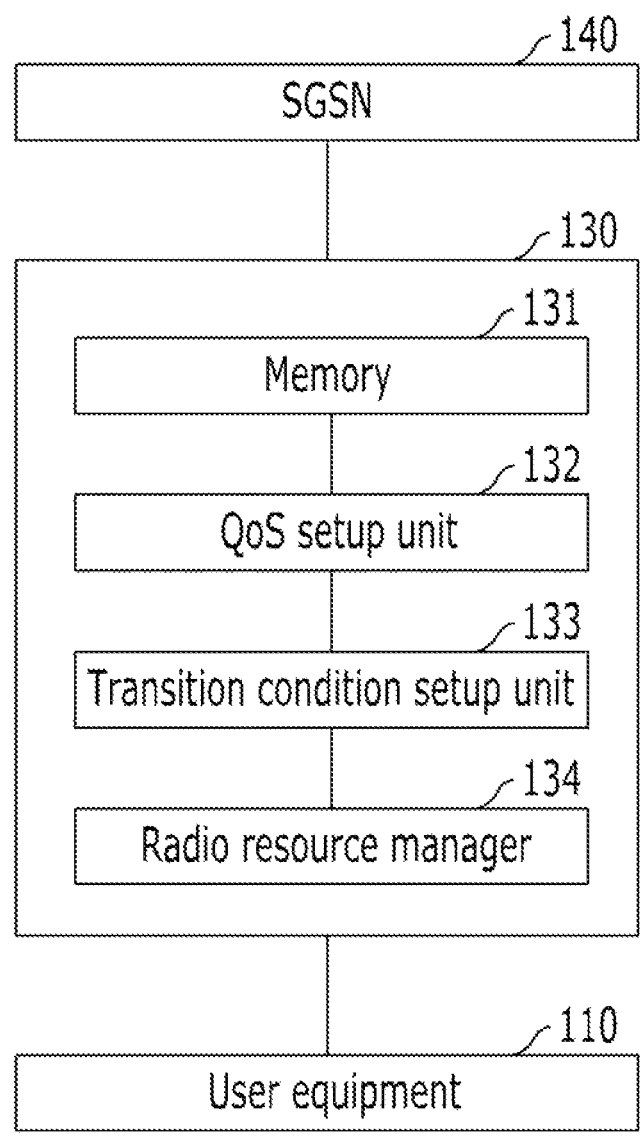
FIG. 3 illustrates a radio network controller in accordance with an exemplary embodiment of the present invention.

FIG. 3 illustrates a radio network controller in accordance with an exemplary embodiment of the present invention.

In accordance with an exemplary embodiment of the present invention, RNC 130 may manage radio resources according to a traffic pattern of user equipment 110. For example, RNC 130 may collect quality of service (QoS) information of user equipment 110 from SGSN 140, determine a QoS level of user equipment 110 based on the collected QoS information, set a state transition condition based on the QoS level of user equipment 110, and manage radio resources based on the state transition condition. Such RNC 130 may include memory 131, QoS setup unit 132, transition condition setup unit 133, and radio resource manager 134, as illustrated in FIG. 3.

Memory 131 may store QoS information of user equipment 110. The QoS information may include a traffic handling priority (THP) and an allocation/retention priority (ARP). The THP may be assigned to a radio bearer associated to user equipment 110. The THP may specify a relative importance for handling of all service data units belonging to a corresponding radio bearer compared to the SDUs of other bearers. The allocation/retention priority (ARP) may be assigned to a radio access bearer (RAB) to compare the priorities of new requests and existing RABs. The THP and the ARP may indicate a QoS level of a subscriber, for example, user equipment 110. The THP and the ARP may have a value from 0 to 15. Since the value 0 indicates a spare and the value 15 indicates 'no priority,' the THP and the ARP may have a value from 1 to 14.

The THP and the ARP may be included in a RAB assignment request message. RNC 130 may receive the RAB assignment request message from SGSN 140 and store information on the THP and the ARP included in the RAB assignment request message in memory 131.

QoS setup unit 132 may determine a QoS level of user equipment 110 based on QoS information of user equipment 110 stored in memory 131. Particularly, QoS setup unit 132 may employ at least one of the THP and the ARP associated with user equipment 110, which are stored in memory 131. For example, QoS setup unit 132 may employ either i) only one of the THP and the ARP or ii) combination of the THP and the ARP to determine a QoS level of user equipment 110. The present invention, however, is not limited thereto, and other factors might be employed to generate a QoS level. For example, in order to determine a QoS level of user equipment 110, QoS setup unit 132 may use other information collected from messages exchanged between RNC 130 and user equipment 110 and/or between RNC 130 and SGSC 140.

Based on the THP and the ARP associated with user equipment 110, QoS setup unit 132 may set a QoS level of user equipment 110. For example, QoS setup unit 132 may set a QoS level of user equipment 110 in proportional to a value of the THP and/or the ARP. Particularly, QoS setup unit 132 may set a QoS level of user equipment 110 to be comparative higher than a given level when values of the THP and the ARP are higher than a certain number. Alternatively, QoS setup unit 132 may set a QoS level of user equipment 110 as comparatively lower than a given level when values of the THP and the ARP are smaller than a certain number. The QoS level higher than the given level may denote that corresponding user equipment may generate more data traffic than others. The present invention, however, is not limited thereto. Such a method for setting a QoS level of user equipment 110 may be modified in various ways.

Transition condition setup unit 133 may set a state transition condition associated with user equipment 110 according to the QoS level of user equipment 110, which is set by QoS setup unit 133. The state transition condition may include a timer and a traffic amount threshold for each RRC state. The period of the timer may denote duration for monitoring a data traffic amount, and the traffic amount threshold may denote a certain data traffic amount that may initiate transition of a RRC state. For example, transition condition setup unit 133 may set a first timer with a comparative larger time period value than a normal given timer period value and a first traffic amount threshold with a comparatively smaller value than a normal given value when the QoS level of user equipment 110 is higher than the given level, but the present invention is not limited thereto. For example, the period of the first timer and the first traffic amount threshold may denote a timer period and a traffic amount threshold that initiate transition between a Cell_DCH state and a Cell_FACH state. Furthermore, transition condition setup unit 133 may set the first timer with a comparatively small time period value and the second traffic amount threshold with a comparatively large value when the QoS level of user equipment 110 is lower than a certain level, but the present invention is not limited thereto. With a similar manner, transition condition setup unit 133 may set a second timer, a second traffic amount threshold, a third timer, and a third traffic amount threshold. The period of the second timer and the second traffic amount threshold may denote a timer period and a traffic amount threshold that initiate transition between a Cell_FACH state and a Cell_PCH state or a URA_PCH state. The period of the third timer and the third traffic amount threshold may denote a timer period and a traffic amount threshold that initiate transition between a Cell_PCH state or a URA_PCH state and an idle mode.

As described above, the timers and the traffic amount threshold may be set with different values according to the QoS level of user equipment 110. In this manner, RRC state transition may be controlled so as to be initiated more frequently or less frequently according to the data traffic pattern of user equipment 110. For example, the timer and the traffic amount threshold may be set to initiate the RRC state transition more frequently when the QoS level of user equipment 110 is higher than a given level. On the contrary, the timer and the traffic amount threshold may be set to initiate the RRC state transition less frequently when the QoS level of user equipment 110 is comparative lower than a given level. When user equipment 110 has a QoS level higher than the given level, user equipment 110 may transfer more data traffic. On the contrary, when user equipment 110 has a QoS level lower than the given level, user equipment 110 may transfer less data traffic. The present invention, however, is not limited thereto. The QoS level, the timer, and the traffic amount threshold may be set differently in accordance with other embodiments of the present invention.

Radio resource manager 134 may manage radio resources based on the state transition condition set by transition condition setup unit 133. Particularly, radio resource manager 134 may monitor a data traffic amount until a corresponding timer expires and compare the monitored data traffic amount with a corresponding traffic amount threshold. Based on the comparison result, radio resource manager 134 may initiate transition of one RRC state to another. In case of a Cell_DCH state, radio resource manager 134 may monitor a data traffic amount until the first timer expires and compare the monitored data traffic amount with the first traffic amount threshold. When the monitored data traffic amount is smaller than the first traffic amount threshold, radio resource manager 134 may initiate transition from a Cell_DCH state to a Cell_FACH state As described above, RNC 130 may set up transition conditions differently according to the QoS level of user equipment and control transition of RRC states based on the setup transition conditions in accordance with an exemplary embodiment of the present invention. Accordingly, radio resources may be effectively and dynamically managed according to a data traffic pattern of user equipment. Hereinafter, such state transition operation of RNC 130 will be described in detail with reference to FIG. 4.

Figure 4:
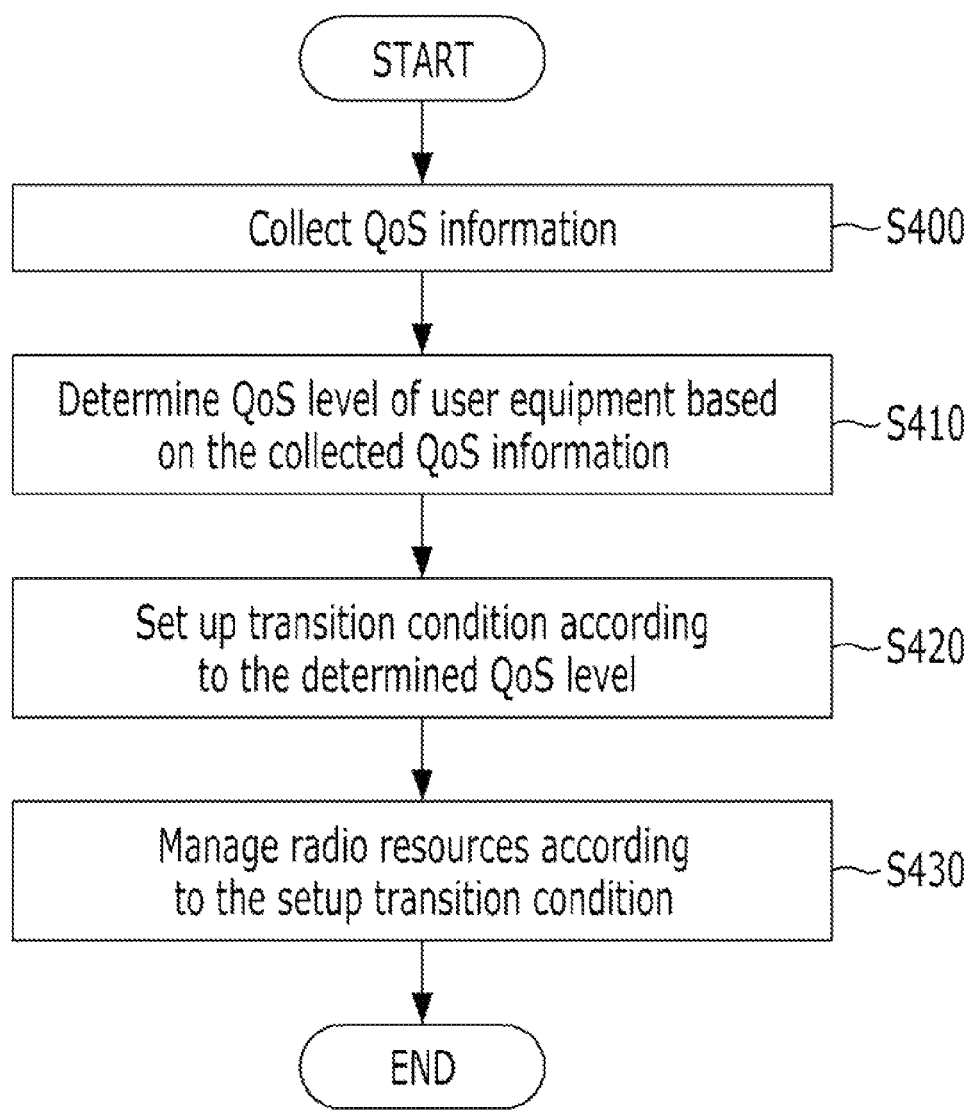
FIG. 4 illustrates a method for managing a radio resource according to a traffic pattern of user equipment in accordance with an exemplary embodiment of the present invention.

FIG. 4 illustrates a method for managing a radio resource according to a traffic pattern of user equipment in accordance with an exemplary embodiment of the present invention. Particularly, an operation of a radio network controller for controlling a state transition based on a traffic pattern of user equipment is illustrated in FIG. 4.

Referring to FIG. 4, QoS information may be collected at step S400. For example, RNC 130 may collect QoS information of user equipment 110 and store the collected QoS information of user equipment 110 in memory 131. The QoS information may be a THP and/or an ARP assigned in association with user equipment 110. Such QoS information may be collected from a RAB assignment request message transmitted from a core network, for example, SGSN 140. The present invention, however, is not limited thereto. Any information indicating QoS assigned to user equipment may be used as the QoS information. Furthermore, any information indicating a user equipment type and/or a data subscription plan of user equipment may be used as information to determine or to set a QoS level of user equipment.

A QoS level of user equipment may be determined and set based on the collected QoS information at step S410. For example, the QoS level of user equipment 110 may be set by QoS setup unit 132 of RNC 130 based on a traffic pattern of user equipment 110. The traffic pattern of user equipment 110 may be determined based on a THP and/or an ARP assigned in association with user equipment 110. Particularly, QoS setup unit 132 may refer to the collected QoS information, such as a THP and an ARP, to set up a QoS level of user equipment 110. As described above, the QoS level of user equipment 110 may be determined in various ways using the THP and the ARP of user equipment 110. One of values of the THP and the ARP may be used for setting the QoS level of user equipment 110. Alternatively, a combination of values of the THP and the ARP may be used for setting the QoS level of user equipment 110. The present invention, however, is not limited thereto. The QoS level may be determined and set using various methods.

At step S420, a transition condition may be set according to the determined and set QoS level. For example, the transition condition may be set by transition condition setup unit 133 of RNC 130. The transition condition may include a first timer period and a first traffic amount threshold for transition between a Cell_DCH state and a Cell_FACH state, a second timer period and a second traffic amount threshold for transition between a Cell_FACH state and a URA_PCH state, and a third timer period and a third traffic amount threshold for transition between a URA_PCH state to an idle mode. Such transition condition may be differently set according to the QoS level of user equipment 110, set at step S410. For example, when the QoS level of user equipment 110 is lower than a given level, the first timer may be set with a comparatively small time period value and the first traffic amount threshold may be set with a comparatively high value. When the QoS level of user equipment 110 is higher than a given level, the first timer may be set with a comparatively large time period value and the first traffic amount threshold may be set with a comparatively small value. The present invention, however, is not limited thereto. Such a method for setting up the transition condition may be modified in various ways.

At step S430, radio resources may be managed based on the set transition condition. Such a radio resource management may be carried out by radio resource manager 134 of RNC 130. For example, radio resource manager 134 may monitor a data traffic amount until the first timer expires.

Radio resource manager 134 may compare the monitored data traffic amount with the first traffic amount threshold. Based on the comparison result, radio resource manager 134 may initiate transition between a Cell_DCH state and a Cell_FACH state. Particularly, when the monitored traffic amount is smaller than the first traffic amount threshold, radio resource manager 134 may initiate transition from a Cell_DCH state to a Cell_FACH state and manages radio resources according to the state transition. For example, radio resource manager 134 may release dedicated physical channels allocated to user equipment 110.

Figure 5:
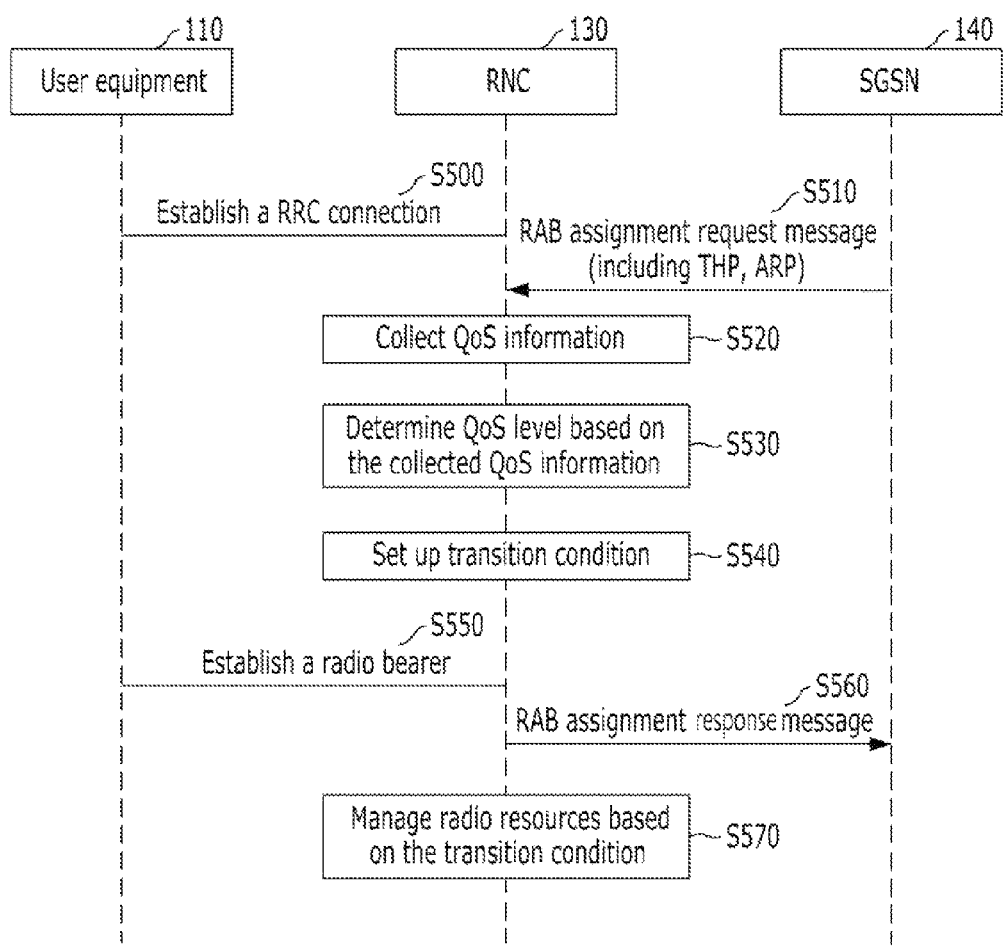
FIG. 5 illustrates a method for managing radio resources according to a traffic pattern of user equipment in accordance with another exemplary embodiment of the present invention.

FIG. 5 illustrates a method for managing radio resources according to a traffic pattern of user equipment in accordance with another exemplary embodiment of the present invention.

Referring to FIG. 5, a radio resource control (RRC) connection may be established between user equipment 110 and RNC 130 at step S500. After the RRC connection is established, the RRC connection may be managed according to a traffic pattern of user equipment 110 in accordance with an embodiment of the present invention.

At step S510, SGSN 140 may transmit a RAB assignment request message to RNC 130. The RAB assignment request message may include QoS information. For example, the QoS setup information may be a THP and/or an ARP assigned in association with user equipment 110. The RAB assignment request message may be transmitted from SGSN 140 to RNC 130 when user equipment 110 requests SGSN 140 to establish a data call session through base station 120 and RNC 130. The RAB assignment request message may also include network information and base station information.

At step S520, RNC 130 may collect QoS information of user equipment 110, such as from QoS information included in the RAB assignment request message. At step S530, RNC 130 may determine and set a QoS level of user equipment 110 based on the collected QoS information from step S520. The QoS information may be the THP and/or the ARP, and the THP and/or the ARP may indicate a traffic pattern of user equipment 110. RNC 130 may set up a QoS level of user equipment 110 based on the THP and/or the ARP. Accordingly, the set QoS level may indicate the traffic pattern of user equipment 110.

At step S540, RNC 130 may set up transition conditions for user equipment 110 based on the set QoS level of user equipment 110. For example, RNC 130 may set up a first timer period and a first traffic amount threshold, a second timer period and a second traffic amount threshold, and a third timer period and a third traffic amount threshold for transition between a Cell_DCH state and a Cell_FACH state, between a Cell_FACH state and a URA_PCH/Cell_PCH state, and between a URA_PCH/Cell_PCH state to an idle mode, respectively.

At step S550, a radio bearer may be established between RNC 130 and user equipment 110. At step S560, RNC 130 may transmit a RAB assignment response message to SGSN 140.

At step S570, RNC 130 may manage radio resources based on the transition conditions set up for user equipment 110. For example, RNC 130 may monitor a data traffic amount until a timer expires and compare the monitored data traffic amount with a corresponding traffic amount threshold. RNC 130 may initiate one or more state transitions based on the comparison result and manage radio resources such as channels allocated to user equipment 110.

As described above, RNC 130 may initiate state transitions in consideration of a pattern of generating data calls in user equipment 110, for example, a traffic pattern of a subscriber. Accordingly, unnecessary state transitions may be prevented.

In this manner, radio resources of a network may be effectively managed by preventing the increment of network load and the decrement of service quality, which might be caused by frequent RRC state transitions.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for managing radio resources according to a traffic pattern of user equipment in a communication network, the method comprising:
   determining a quality of service (QoS) level of the user equipment based on QoS information associated with the user equipment;
   setting transition conditions based on the determined QoS level of the user equipment; and
   managing radio resources associated with the user equipment according to the set transition conditions;
   wherein, in the setting transition conditions: the transition conditions include a timer having a period and a traffic amount threshold for initiating transition between a first radio resource control (RRC) state and a second RRC state; and
   the timer having the period and the traffic amount threshold are set according to the determined QoS level of the user equipment;
   wherein the managing radio resources includes: monitoring an amount of data traffic generated until the timer expires;
   comparing the generated data traffic amount with the traffic amount threshold; and initiating transition between a first radio resource control (RRC) state and a second RRC state according to the comparison result.

2. The method of claim 1, wherein: the QoS level of the user equipment indicates a pattern of generating data traffic in the user equipment; and the user equipment having the QoS level higher than a given level provides data traffic relatively more frequently than user equipment having a QoS level lower than the given level.

3. The method of claim 1, wherein: the QoS information includes information on at least one of a QoS priority assigned to the user equipment, a type of the user equipment, and a data subscription; and the QoS level of the user equipment is higher than a given level when the QoS information indicates at least one of that a high QoS priority is assigned to the user equipment, that the type of the user equipment is a smart phone, and that the user equipment is registered with an unlimited data subscription plane.

4. The method of claim 1, wherein the QoS information is included in a radio access bearer (RAB) assignment request message transmitted from a core network.

5. The method of claim 1, wherein the QoS information includes a traffic handling priority and an allocation/retention priority.

6. The method of claim 5, wherein the QoS level is based on at least one of a value of the traffic handling priority, a value of the allocation/retention priority, and a combination of the value of the traffic handing priority and the value of the allocation/retention priority.

7. The method of claim 1, wherein: the QoS level greater than the given QoS level indicates that the user equipment provides data traffic of a level more than user equipment having a QoS level smaller than the given QoS level; and the QoS level smaller than the given QoS level indicates that the user equipment provides data traffic of a level less than user equipment having a QoS level greater than the given QoS level.

8. The method of claim 7, wherein: when the QoS level of the user equipment is greater than a given QoS level, the timer and the traffic amount threshold are set to initiate state transition less frequently than user equipment having a QoS level smaller than the given QoS level; and when the QoS level of the user equipment is smaller than the given QoS level, the timer and the traffic amount threshold are set to initiate state transition more frequently than user equipment having a QoS level greater than the given QoS level.

9. The method of claim 7, wherein: the timer is set with a timer period value greater than a given time value and the traffic amount threshold is set with a traffic value smaller than a given threshold when the QoS level of the user equipment is greater than a given QoS level; and the timer is set with a timer period value smaller than the given time value and the traffic amount threshold is set with the traffic value smaller than the given threshold when the QoS level of the user equipment is smaller than the given QoS level.

10. The method of claim 1, wherein the timer and the traffic amount threshold includes a first timer and a first traffic amount threshold for transition between a Cell_dedicated channel (Cell_DCH) state and a Cell_forward access channel (Cell_FACH) state, a second timer and a second traffic amount threshold for transition between a Cell_FACH state and a UTRAN registration area_paging channel (URA_PCH) state or a Cell_paging channel (Cell_PCH) state, a third timer and a third traffic amount threshold for transition between a URA_PCH state or a Cell_PCH state and an idle mode.

11. The method of claim 1, wherein in the managing radio resources includes: controlling transition between a first radio resource control (RRC) state and a second RRC state according to the set transition conditions.

12. The method of claim 1, wherein: the radio resources are channels associated with the user equipment according to transition of a radio resource control (RRC) state; and comprising establishing the channels between the user equipment and a core network through a radio access network.

13. A method for controlling transition of a radio resource control (RRC) state according to a quality of service (QoS) level of user equipment, the method comprising:
receiving a radio access bearer (RAB) assignment request message from a core network collecting a traffic handling priority and an allocation/retention priority from the RAB assignment request message;
determining the QoS level of the user equipment based on the collected traffic handling priority and allocation/retention priority;
setting a timer and a traffic amount threshold according to the determined QoS level of the user equipment;
monitoring an amount of data traffic generated until the set timer expires;
comparing the generated data traffic amount with the set traffic amount threshold; and
initiating transition between a first RRC state and a second RRC state based on the comparison result.

14. The method of claim 13, wherein in the setting the timer and the traffic amount threshold: the timer and the traffic amount threshold are set to initiate the transition less frequently for user equipment having the QoS level greater than a given QoS level; the timer and the traffic amount threshold are set to initiate the transition more frequently for user equipment having the QoS level smaller than the given QoS level; and the QoS level greater than the given QoS level indicates that the user equipment generate data traffic at a level more than user equipment having a QoS level smaller than the given QoS level.

15. An apparatus for managing radio resources according to a traffic pattern of user equipment, the apparatus comprising:
a memory configured to collect and store quality of service (QoS) information of the user equipment;
a QoS level setup unit configured to determine a QoS level of the user equipment based on the QoS information in the memory;
a transition condition setup unit configured to set transition conditions associated with the user equipment based on the determined QoS level of the user equipment; and
a radio resource manager configured to manage radio resources associated with the user equipment by initiating transition between a first radio resource control (RRC) state and a second RRC state according to the setup transition conditions of the user equipment;
wherein the transition conditions include a timer having a period and a traffic amount threshold adapted to initiate transition between a first radio resource control (RRC) state and a second RRC state; and
the radio resource manager configured to:
monitor an amount of data traffic generated until the timer expires;
compare the generated data traffic amount with the traffic amount threshold; and
initiate the transition between the first RRC state and the second RRC state according to the comparison result.

16. The apparatus of claim 15, wherein: the memory is configured to store, as the QoS information, a traffic handling priority and an allocation/retention priority included in a radio access bearer (RAB) assignment request message transmitted from a core network; and the QoS level setup unit is configured to determine the QoS level based on at least one of a value of the traffic handling priority, a value of the allocation/retention priority, and the combination of the value of the traffic handling priority and the value of the allocation/retention priority.

17. The method of claim 15, wherein: the QoS level greater than the given QoS level indicates that the user equipment is expected to generate data traffic more than user equipment having a QoS level smaller than the given QoS level; and the transition condition setup unit configured to: set the timer and the traffic amount threshold so as to initiate the transition less frequently for user equipment having the QoS level greater than a given QoS level; and set the timer and the traffic amount threshold so as to initiate the transition more frequently for user equipment having the QoS level smaller than the given QoS level.

* * * * *